July 24, 1951  E. S. BUHAYAR  2,562,014
JOINTING MEANS FOR PIPES AND COUPLINGS AND THE LIKE
Filed Oct. 2, 1947  2 Sheets-Sheet 1
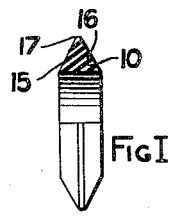
Fig I
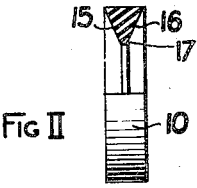
Fig II
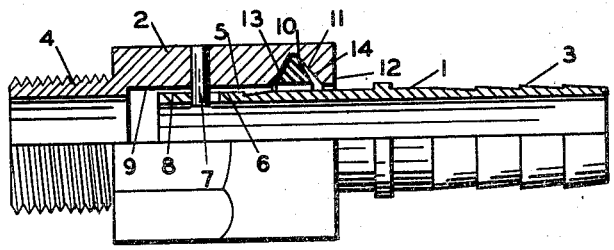
Fig III
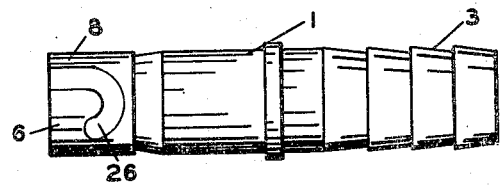
Fig IV
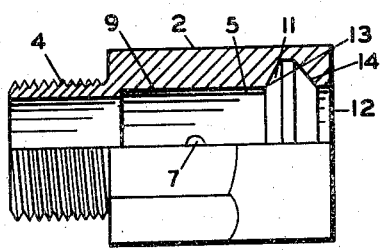
Fig V
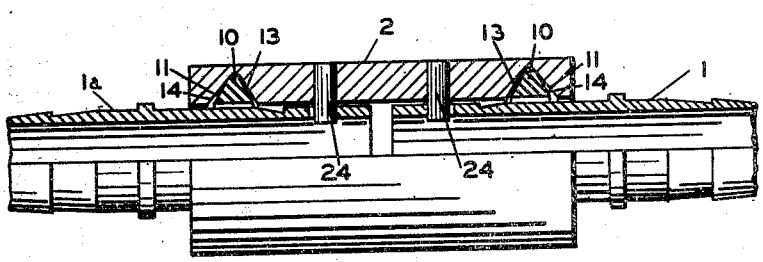
Fig VI
INVENTOR.
Eric S. Buhayar
BY Francis E. Boyce
Attorney July 24, 1951          E. S. BUHAYAR          2,562,014
JOINTING MEANS FOR PIPES AND COUPLINGS AND THE LIKE
Filed Oct. 2, 1947          2 Sheets-Sheet 2
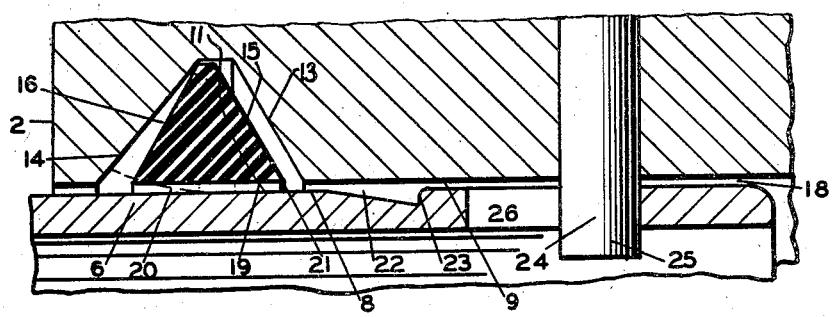
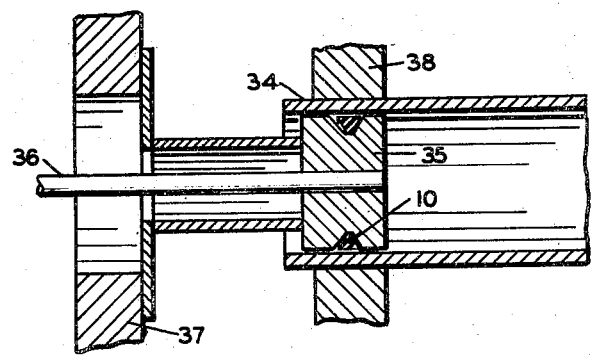
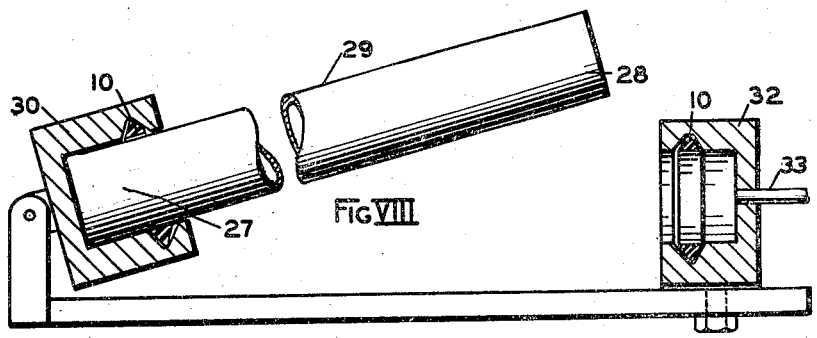
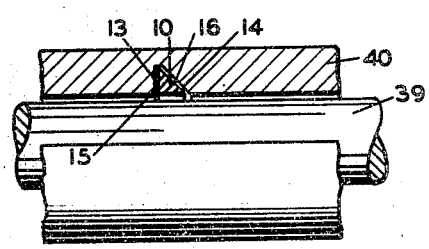
INVENTOR.
Eric S. Buhayar
BY
Francis E. Boyce
Attorney

Patented July 24, 1951

2,562,014

UNITED STATES PATENT OFFICE

2,562,014

JOINTING MEANS FOR PIPES AND COUPLINGS AND THE LIKE

Eric Stephen Buhayar, Berea, Johannesburg, Transvaal, Union of South Africa

Application October 2, 1947, Serial No. 777,546
In the Union of South Africa July 29, 1947

5 Claims. (Cl. 285—175)

This invention relates to joints between telescoping units and in particular to joints for air pipe couplings for rock drills and the like.

In temporarily plugging the ends of smooth unflanged pipes or in coupling pipes to one another, or to rock drilling and other machines, a form of jointing is desirable which will easily be placed and retained in position, and will allow the parts to be quickly separated and yet will form a fluid tight seal under pressure and will also resist accidental uncoupling under working conditions.

The object of this invention is to provide a form of jointing or packing which will rock in its recess under fluid pressure and by such rocking movement between the parts to be sealed will make a fluid-tight joint.

A further object is to provide parts shaped to accommodate the above mentioned form of jointing.

A further object is to provide a rock drill pipe coupling embodying this form of jointing.

A still further object is to provide a packing or joint in the form of a ring or rings of rubber or similar resilient material triangular or delta shaped in cross section and with either its base or its apex forming the bore of the ring.

The accompanying drawings illustrate the invention and some of its applications:

Figs. I and II show the resilient packing rings partly in cross section.

Fig. III is a partly sectional view of a coupling suitable for connecting a hose pipe to a rock drill or other apparatus.

Fig. IV is a side elevation of the male member of Fig. III.

Fig. V is a partly sectional view of the female member of Fig. III.

Fig. VI is similar to Fig. III but showing the coupling suitable for connecting two lengths of piping.

Fig. VII is a partial view of Fig. III on an enlarged scale.

Fig. VIII shows on a reduced scale a further application of the invention.

Fig. IX shows another application of the invention with the packing ring in the form of Fig. II, and Fig. X shows a detail in a further application of the invention.

Considering Figs. I, II, III, IV, and V, these will serve for a description of the invention as applied to a pipe coupling suitable for use in attaching air hose pipes to rock drills.

The coupling comprises two units 1, 2 which are adapted to telescope one into the other. The end 3 of unit 1 is adapted to fit into a hose pipe and the end 4 of unit 2 is screwed to fit a rock drill. The socket 5 in unit 2 and the spigot 6 of unit 1 of the coupling are an easy sliding fit, the one into the other and in fact there may be relatively a large clearance between these parts. They may be strapped together by means of a bayonet joint 7 or otherwise connected in any well known manner.

Between the outer periphery 8 of the spigot 6 and the inner periphery 9 of the socket 5 is placed the joint making member or ring 10. The socket 5 has an annular V groove 11 formed in its inner wall and conveniently near its end 12. The walls 13, 14 of the groove 11 approach one another at an angle greater than the angle formed by the sides 15, 16 forming the apex 17 of the triangular packing ring 10. The apexes of the groove and the packing correspond but the sharp edge of the apexes 17 are usually removed or rounded so that in section the packing is as shown in Figs. I and II. The apex of the groove is cut to form a clearance over the apex 17 of the ring 10.

The sealing action of the joint will be described with reference to Fig. VII. When the air passes through the gap 18 between the surfaces 8, 9, a pressure drop occurs on the base 19 of the triangle, due to the velocity of the fluid through the passage 20 and the net pressure on the various faces of the ring 10 causes same to rock as indicated in the dotted lines. The tipping of the triangular ring 10 means that one end 21 of its base tends to reduce its internal diameter and in this case to press it more firmly against the surface of the spigot 6, said pressure increasing with every increase in the fluid pressure. In other words there is with the increasing pressure of the fluid in the units 1, 2 a tendency to increase the rocking or upsetting of the triangular packing and consequently the jointing material between the coupled parts 1, 2 is further compressed and the joint between them is thus made more fluid tight.

The part 22 of the spigot 6 beyond the ring 10 is shown as tapered slightly and it will be obvious that if the parts 1, 2 should become disengaged while under pressure the point 21 of ring 10 will be caught in the step 23 and so increase the distortion of ring 10 resulting in a locking together of the parts under a still greater distortion of the packing ring 10.

Beyond the step 23 in the construction shown the unit 1 terminates in a bayonet joint 24. 25 is the pin of said joint in socket 5 and 26 is its channel in spigot 6.

It should further be pointed out that where the fit between the spigot 1 and socket 2 is not precise or where the fluid pressures encountered are high or where the angles of the sides 13, 14 of the groove 11 accommodating the packing may be varied so as to allow the packing to rock as described and to an extent to provide the necessary sealing.

Fig. VI illustrates a form of the invention useful for coupling together two pipes such as two hoses. The spigots 1, 1a, enter from each end of a common socket 2 and each have their bayonet joint 24.

Fig. VIII shows an adaptation of the invention for use in testing under pressure plain ended pipes. The ends 27, 28 of the pipes 29 provide the spigots of the couplings. The one socket 30 is anchored by means of an hinged joint 31 and said socket 30 is provided with the jointing ring 10 to fit the pipe 29 in the manner already described. A socket 32 similar to socket 30 is free to slide towards socket 30 and clamped when in position so that pipes of various lengths may be accommodated between them. Socket 32 also has a connection 33 by which pressure fluid can be supplied to the pipes to be tested. With this apparatus all that is necessary for the testing operation is to insert one end of the pipe into socket 30 and then push socket 32 onto the other end and turn on the pressure fluid. The pipe ends 27, 28 are an easy fit in the rings 10 and the sockets 30, 32 and the resiliency of the packing material and the shape of the ring 10 acts under pressure to form an effective joint even if the parts do not fit closely or if the surface of the pipe is somewhat rough or irregular as already described.

Where the outside of the ends of a pipe or tube 34 cannot be encircled by a joint making socket as in Fig. IX the ends may be fitted with a plug 35 in which a jointing ring 10 similar to that shown in Fig. II is accommodated. The connection 36 carrying the pressure fluid passes through the plug 35 and 37 is a suitable buttress to withstand the pressure on the inner surface of the plug 35 to prevent it being pushed out of the end of the pipe 34.

This arrangement is suitable in testing the fire tubes of a boiler. 34 will then represent one end of a fire tube and 38 a section of the wall of a fire box.

In some instances the packing 10 may be used in place of the usual gland or bucket type of packing in cases where the parts are subjected to relative longitudinal sliding movement. An application is illustrated in Fig. X, where 39 represents a portion of the plunger of an hydraulic jack and 40 its wall. In this case the angles of the sides 15, 16 of the packing 10 and the angles of the walls 13, 14 of its groove 11 may be modified to avoid binding of the packing between the closely fitting parts and to make the packing more effective to carry the load, or in other words more effective in resisting the pressure of the fluid supporting the load.

Some of the advantages of this joint are that the packing, owing to its triangular or delta shape, provides a thinned contact making edge or end 21 which is sharp but not weak. Also when it is deformed to fill the space between the parts, even if they are not originally made to be close fitting, it recovers its shape automatically to release the parts when the pressure is removed.

This invention provides a packing of triangular shape which is accommodated in a groove in one or other of the coupling members between which a fluid pressure resisting joint is to be made. Said groove is large enough to allow a rocking movement of the packing 10 to take place and is suitably shaped to accommodate the packing when it is distorted and for its recovery of shape to release the parts when the pressure of the fluid to be retained is removed. It should be pointed out that from the above description it will be realized that the coupled parts according to this invention are held attached when the fluid pressure is on the coupling so that separation under working conditions is difficult even without the provision of the bayonet or other holding means.

What I claim as new and desire to secure by Letters Patent is:

1. A coupling comprising two telescoping cylindrical members, an annular space between said members means for connecting said members together, an annular groove of truncated equilateral triangular cross section with its base cutting the surface of one of the adjacent peripheries of the members, an annular notch cutting the opposite adjacent periphery of the other member and a resilient ring corresponding in shape and loosely fitting in said groove and not projecting into the annular space between the telescoping members.

2. A temporary fluid actuated coupling comprising telescoping cylindrical members, an annular space between said members, an annular groove of substantially triangular cross section in one of said members with its base towards the space between said members, and a resilient ring of substantially triangular shape in cross section loosely located in said groove and having its base clear of the cylindrical surface of the ungrooved member when the members are assembled, said ring rockable and deformable under fluid pressure in the annular space in clamping engagement between the telescoping members.

3. A temporary fluid actuated coupling comprising telescoping cylindrical members, an annular space between said members, a mechanical connection holding the members together, an annular groove of substantially triangular cross section in one of said members with its base towards the space between said members, and a resilient ring of substantially triangular shape in cross section loosely located in said groove and having its base clear of the cylindrical surface of the ungrooved member when the members are assembled, said ring rockable and deformable under fluid pressure in the annular space in clamping engagement between the telescoping members.

4. A temporary fluid actuated coupling comprising telescoping cylindrical members, an annular space between said members, one member in the form of a plug in the other member, an annular groove of substantially triangular cross section in one of said members with its base towards the space between said members, and a resilient ring of substantially triangular shape in cross section loosely located in said groove and having its base clear of the cylindrical surface of the ungrooved member when the members are assembled, said ring rockable and deformable under fluid pressure in the annular space in clamping engagement between the telescoping members.

5. A temporary fluid actuated coupling comprising telescoping cylindrical members, an annular space between said members, one member in the form of a socket closing the other member, an annular groove of substantially triangular cross section in one of said members with its base towards the space between said members, and a resilient ring of substantially triangular shape in cross section loosely located in said groove and having its base clear of the cylindrical surface of the ungrooved member when the members are assembled, said ring rockable and deformable under fluid pressure in the annular space in clamping engagement between the telescoping members.

ERIC STEPHEN BUHAYAR.

REFERENCES CITED

The following references are of record in the file of this patent:

UNITED STATES PATENTS

| Number | Name | Date |
|---|---|---|
| 199,312 | Perkins | Jan. 15, 1878 |
| 365,387 | Klein | June 28, 1887 |
| 865,498 | Kenyon | Sept. 10, 1907 |
| 2,093,092 | McElhany et al. | Sept. 14, 1937 |
| 2,138,946 | Trickey | Dec. 6, 1938 |
| 2,355,407 | Wyss | Aug. 8, 1944 |

FOREIGN PATENTS

| Number | Country | Date |
|---|---|---|
| 162,221 | Switzerland | Aug. 16, 1933 |
| 415,425 | Great Britain | Aug. 24, 1934 |